United States Patent
Hamminga et al.

(10) Patent No.: US 10,534,070 B2
(45) Date of Patent: Jan. 14, 2020

(54) AVIAN DETECTION SYSTEM USING TRANSPONDER DATA

(71) Applicant: Robin Radar Facilities BV, The Hague (NL)

(72) Inventors: Siete Hamminga, Heemstede (NL); Anthonie van Lieburg, Nieuwerkerk aan de IJssel (NL)

(73) Assignee: Robin Radar Facilities BV, The Hague (NL)

( * ) Notice: Subject to any disclaimer, the term of this patent is extended or adjusted under 35 U.S.C. 154(b) by 445 days.

(21) Appl. No.: 15/120,925

(22) PCT Filed: Feb. 27, 2015

(86) PCT No.: PCT/EP2015/054169
§ 371 (c)(1),
(2) Date: Aug. 23, 2016

(87) PCT Pub. No.: WO2015/128478
PCT Pub. Date: Sep. 3, 2015

(65) Prior Publication Data
US 2016/0363652 A1     Dec. 15, 2016

(30) Foreign Application Priority Data
Feb. 27, 2014   (DK) .................................. 2014 00113

(51) Int. Cl.
*G01S 7/41*     (2006.01)
*A01M 31/00*    (2006.01)
(Continued)

(52) U.S. Cl.
CPC ............ *G01S 7/415* (2013.01); *A01K 29/005* (2013.01); *A01M 29/16* (2013.01);
(Continued)

(58) Field of Classification Search
CPC .... G01S 13/9303; G01S 13/91; G01S 13/781; G01S 13/913; G01S 13/953; G01S 13/86;
(Continued)

(56) References Cited

U.S. PATENT DOCUMENTS 8,279,109 B1   10/2012 Piesinger
8,704,700 B2 *  4/2014 Vacanti ................... G01S 7/415
                                                    342/29

(Continued)

FOREIGN PATENT DOCUMENTS

EP      2485063 A1   8/2012

OTHER PUBLICATIONS

B S Ta et al, "BSTAR System", Sep. 9, 2013, 2 pages, Retrieved from http://www.scrcinc.com/pdf/42-BSTAR.pdf.
(Continued)

*Primary Examiner* — Olumide Ajibade Akonai
(74) *Attorney, Agent, or Firm* — Ziegler IP Law Group, LLC

(57) ABSTRACT

An avian detection system for determining risks of collision between a collision object and bird objects includes avian radar system(s) providing a first type of information data relating to objects detected, and a transponder receiver receiving transponder data transmitted or broadcasted by transponders provided at the collision objects. Processors are configured to receive first type of information data corresponding to the detected objects and provide radar plots. The processors are further configured to receive the transponder data and provide transponder plots, to create and store a number of object tracks based on the provided radar plots and transponder plots, with each track holding object data corresponding to or determined from data of matching plots, and to determine one or more risks of collision or collision risk levels for the collision object based on object data of a plurality of the obtained object tracks.

18 Claims, 7 Drawing Sheets

(51) Int. Cl.
*G01S 13/93* (2006.01)
*G01S 13/00* (2006.01)
*G01S 13/72* (2006.01)
*G01S 13/78* (2006.01)
*G01S 13/87* (2006.01)
*G01S 13/91* (2006.01)
*A01K 29/00* (2006.01)
*G01S 19/03* (2010.01)
*G08G 5/04* (2006.01)
*A01M 29/16* (2011.01)

(52) U.S. Cl.
CPC ......... *A01M 31/002* (2013.01); *G01S 13/003* (2013.01); *G01S 13/723* (2013.01); *G01S 13/781* (2013.01); *G01S 13/872* (2013.01); *G01S 13/91* (2013.01); *G01S 13/9303* (2013.01); *G01S 19/03* (2013.01); *G08G 5/045* (2013.01)

(58) Field of Classification Search
CPC .... G01S 13/003; G01S 13/726; G01S 13/951; G01S 13/765; G01S 13/872; G01S 7/415
See application file for complete search history.

(56) References Cited

U.S. PATENT DOCUMENTS

| | | | | |
|---|---|---|---|---|
| 9,310,477 | B1* | 4/2016 | Sampigethaya | G01S 13/91 |
| 9,465,104 | B2* | 10/2016 | Margolin | G01S 13/42 |
| 9,594,162 | B1* | 3/2017 | Sonera | G01S 13/953 |
| 2003/0060941 | A1 | 3/2003 | Griffith et al. | |
| 2007/0024494 | A1* | 2/2007 | Dizaji | G01S 7/412 342/90 |
| 2008/0266171 | A1* | 10/2008 | Weber | G01S 7/003 342/123 |
| 2010/0315281 | A1* | 12/2010 | Askelson | G01S 7/003 342/30 |
| 2011/0125349 | A1* | 5/2011 | Ace | B64D 45/00 701/14 |
| 2015/0204973 | A1* | 7/2015 | Nohara | G01S 13/426 342/107 |

OTHER PUBLICATIONS

"Radar System Options", Oct. 17, 2013, 2 pages, Retrieved from http://www.scrcinc.com/pdf/73-Radar-System-Options.pdf.

"Robin Systems & Services", Nov. 28, 2011, 20 pages, Retrieved from http://www.robinradar.com/wp-content/uploads/2014/05/Brochure_-Systems-Services.pdf.

Matthew W Klope et al., "Role of near-miss bird strikes in assessing hazards", Human-Wildlife Intercations, Jan. 10, 2009, 9 pages, Retrieved at http://digitalcommons.unl.edu/cgi/viewcontent.cgi?article=1010&context=hwi.

Peter Weber et al., "Affordable, Real-Time, 3-D Avian Radar Networks for Centralized North American Bird Advisory Systems", Aug. 14, 2005, 9 pages, Originally Retrieved at http://www.birdstrikecanada.com/Papers2005/Nohara.pdf. Retrieved on Aug. 18, 2016 at http://www.digitalcommons.unl.edu/cgi/viewcontent.cgi?article=1006&context=birdstrike2005.

International Search Report, Application No. PCT/EP2015/054169, dated Jun. 16, 2016, 3 pags.

* cited by examiner

AVIAN DETECTION SYSTEM USING TRANSPONDER DATA

FIELD

The aspects of the disclosed embodiments relates to an avian detection system and a method for determining risks of collision between a collision object, such as an air plane, and bird objects that may pose a collision risk with the collision object.

BACKGROUND

In existing avian radar systems static 3D zones can be defined as alarm zones. Within that zone specific birds (e.g. large birds and flocks) generate an audio or visual alarm to warn air traffic control. This alarm can be used to e.g. scare away birds. The alarms are based on size and location of the bird only. In practice this leads to situations where there may be too many alarms, too many false alarms or alarms that come too late.

SUMMARY

On the above background the aspects of the disclosed embodiments provide an avian radar system that reduces the number of false alarms generated by the avian radar, i.e. a system that does not elicit an alarm when no plane is close by the areas in which birds or other possible collision objects are present. In order to attain this object it is necessary to be able to detect both the position and extension of birds or flocks of birds and also the position of planes actually approaching the area in which collision with birds could potentially take place.

The above and other object and advantages may be obtained according to the invention by the provision of an avian radar system that combines data obtained by radar detection of objects, such as bird objects, with transponder data (e.g. from an ADS-B system). The combined data may be used for collision course probability estimation, alarm calculations and classification verification.

At present radar images are used to track and monitor aircrafts and vehicles. This radar information can be combined with radar information of birds. According to the invention, this information may advantageously be supplemented with transponder information from which information the position of a collision object, such as an aircraft can be determined. Using transponder information may give multiple advantages, such as:

(1) Transponder based systems recognizes static objects, e.g. planes standing on a runway waiting for take-off. A radar system may filter this information out because the object is not moving.

(2) Transponder data yields extra information about the object: For instance, when plane type is known, climbing angle can be predicted more precisely and collision course risk can therefore be calculated in a more reliable way. Furthermore, planned flight schedule and flight route can also be used for collision cause calculations.

(3) Transponder based systems mostly have a very long range (longer than local avian radar systems). This gives the opportunity to predict what aircrafts and vehicles are to enter the radar covered area.

(4) Radar observations degrade at certain weather circumstances, whereas data from transponder systems are much less sensitive to adverse weather conditions.

According to the present invention transponder data may be used as stored data or as real-time data:

(1) Transponder data may be stored in a central database in the system. Historical transponder data may be used to calculate the typical flight path for a type of plane on a particular runway under particular weather conditions. Such historical data may be useful for detailed collision calculations.

(2) Transponder data may be incorporated in a Bird Monitor (BM, near real-time), an example embodiment of which is described in more detail in the detailed description of the invention. The Bird Monitor may merge transponder data, which may be in the form of a transponder plot, with radar data, which may be obtained from one or more radar plots, to obtain an object track of combined or merged data, and the merged data track may be displayed in real time. The merged tracks may contain more detailed information on the risk of collision than tracks based solely on radar information.

According to a first aspect of the invention there is provided an avian detection system for determining risks of collision between a collision object, such as an air plane, and bird objects that may pose a collision risk with the collision object, the system comprising:
one or more avian radar systems providing a first type of information data relating to objects detected by the avian radar system(s);
a transponder receiver receiving transponder data transmitted or broadcasted by one or more transponders provided at one or more corresponding collision objects; and
one or more processors configured to:
receive first type of information data corresponding to one or more detected objects and provide radar plots based on the first type of information data;
receive the transponder data corresponding to one or more collision objects and provide transponder plots based on the transponder data;
create and store a number of object tracks based on the provided radar plots and transponder plots, each track holding object data corresponding to or determined from data of matching plots; and
determine one or more risks of collision or collision risk levels for at least one collision object based on object data of a plurality of the obtained object tracks.

For the first aspect of the invention the one or more processors may be configured to:
determine based on stored object data of an obtained track whether the track is a bird track or a collision object track, where a determined collision object track represents a corresponding collision object; and
determine the one or more risks of collision or collision risk levels for the at least one collision object based on object data of one or more bird tracks and the corresponding collision object track(s).

According to the first aspect of the invention there is also provided an avian detection system for determining risks of collision between a collision object, such as an air plane, and bird objects that may pose a collision risk with the collision object, the system comprising:
one or more avian radar systems providing a first type of information data relating to objects detected by the avian radar system(s);
a transponder receiver receiving transponder data transmitted or broadcasted by one or more transponders provided at one or more corresponding collision objects; and
one or more processors configured to:
receive first type of information data corresponding to one or more detected objects and provide radar plots based on the first type of information data;

receive the transponder data corresponding to one or more collision objects and provide transponder plots based on the transponder data;

create and store a number of object tracks based on the provided radar plots and transponder plots, each track holding object data corresponding to or determined from data of matching plots;

determine based on stored object data of an obtained track whether the track is a bird track or a collision object track, where a determined collision object track represents a corresponding collision object; and determine one or more risks of collision or collision risk levels for at least one collision object based on object data of one or more bird tracks and the corresponding collision object track(s).

It is preferred that the one or more processors of the first aspect of the invention are configured to determine a risk or probability of collision between a collision object and a bird object based on object data of object tracks representing the collision object and the bird object, which can be a bird track and a collision object track. The one or more processors may further be configured to determine a severity of such a collision based at least partly on object data of an object track representing the bird object, which can be the bird track, and further configured to determine the collision risk level based on the obtained risk or probability of collision and the obtained severity of the collision.

It is preferred that the avian detection system of the first aspect further comprises a monitor or visualizer with the one or more processors being configured to visualize one or more of the created objects tracks via said monitor or visualizer.

The one or more processors of the first aspect of the invention may be configured to store a number of radar plots and transponder plots based on successively received first type of information and successively received transponder data; and to create one or more object tracks based on data of a plurality of the stored plots when predetermined matching conditions are fulfilled for corresponding data of said plurality of stored plots.

The one or more processors of the first aspect of the invention may be configured to provide updated radar plots and transponder plots based on received updated first type of information and received updated transponder data; to compare data of an updated plot with data of stored tracks; and to update data of a stored track when predetermined matching conditions are fulfilled for corresponding data of the stored track and the updated plot.

The one or more processors of the first aspect of the invention may be configured to determine one or more updated risks of collision or collision risk levels for the at least one collision object when one or more tracks are updated.

For the first aspect of the invention the first type of information data may comprise data representing position or location and size of detected objects, and a radar plot may hold position or location and size data obtained from the received first type of information relating to the corresponding detected object. The position or location data can include both the horizontal position and the vertical position or altitude of the detected objects.

The one or more processors of the first aspect of the invention may be configured to determine speed and direction of movement of an object detected by the avian radar system(s) based on a plurality of radar plots holding position and size data obtained from successively received first type of information relating to said detected object.

For the first aspect of the invention a transponder plot may hold at least part of the transponder data of a corresponding collision object, said transponder data representing all or part of the following: position or location, altitude, direction of movement, speed, type or ICAO code, and status of the collision object.

For the first aspect of the invention then when creating an object track from stored plots, the predetermined matching conditions to be fulfilled between data of the stored plots may at least comprise a match between position data of the plots. The predetermined matching conditions to be fulfilled between data of the stored plots may further comprise a match between size data and/or a match between type of collision object data or ICAO data of the plots. The predetermined matching conditions to be fulfilled between data of the stored plots may also comprise a match between speed data and/or a match between direction of movement data determined from the plots.

For the first aspect of the invention then when comparing data of a stored track with data of a plot or updated plot, the predetermined matching conditions to be fulfilled between data of the stored track and the updated plot may at least comprise a match between position data of the track and the plot. The predetermined matching conditions to be fulfilled between data of the stored track and the updated plot may further comprise a match between size data and/or type of collision object data or ICAO data of the track and the plot. The predetermined matching conditions to be fulfilled between data of the stored track and the updated plot may also comprise a match between speed data and/or a match between direction of movement data.

The one or more processors of the first aspect of the invention may be configured to determine when a match condition is fulfilled for a set of corresponding data based on a predetermined threshold difference between the data being matched.

The one or more processors of the first aspect of the invention may be configured to determine whether an obtained track is a bird track or a collision object track based at least partly on stored track data representing size of object and/or on stored track data representing type of collision object or ICAO code of collision object. The one or more processors may further be configured to determine whether an obtained track is a bird track or a collision object track based at least partly on stored track data representing speed of the object. The one or more processors may also be configured to determine sinuosity of a movement curve for an object represented by a track, and configured to determine whether an obtained track is a bird track or a collision object track based at least partly on stored track data representing sinuosity of the object. Sinuosity can be obtained by measuring the change of direction of a movement curve per timeframe.

The one or more processors of the first aspect of the invention may be configured to classify a determined bird track and a determined collision object track as belonging to a certain classification class. Here, the one or more processors may be configured to classify a determined bird track based on stored track data representing size of the object, and to classify a determined collision object track based on stored track data representing size of object and/or representing type of collision object or ICAO code of collision object. The classification classes of a detected bird may comprise: large bird, medium bird and small bird. The classification classes of a detected collision object may comprise: plane and vehicle. A bird track can represent a single bird, several birds or a flock of birds. The size of a bird can be the size of a single bird, several birds or a flock of birds.

The one or more processors of the first aspect of the invention may be configured to determine when a collision object of a collision object track and an object of a bird track are on a collision course based on data of the bird track and the collision object track, and to determine a collision risk level for the collision object based on data of the collision object track and the bird track when the collision object and the object of the bird track are on a collision course.

The one or more processors of the first aspect of the invention may be configured to determine the risk of collision or the collision risk level for a collision object of a collision object track and an object of a bird track based at least partly on position data of the collision object track and the bird track.

The one or more processors of the first aspect of the invention may be configured to determine the risk or probability of collision between a collision object and a bird object based at least partly on position or location data of the corresponding collision object track and bird track, and to determine the severity of such collision based at least partly on size data of the bird track. The one or more processors may also be configured to determine the risk or probability of collision between a collision object and a bird object based at least partly on speed data and/or direction of movement data of the corresponding collision object track and bird track. It is also within an embodiment of the first aspect of the invention that the one or more processors are configured to determine sinuosity of a movement curve for an object represented by a track, and further configured to determine the risk or probability of collision between the collision object and the bird object based at least partly on the sinuosity of the corresponding collision object track and/or bird track.

The one or more processors of the first aspect of the invention may be configured to determine the collision risk level by multiplying a determined risk or probability of collision with a determined severity of the collision.

The one or more processors of the first aspect of the invention may be configured to allow generation of an alarm or alert when a determined collision risk level exceeds a predetermined risk level.

The avian detection system of the first aspect of the invention may have a detection coverage range, and the one or more processors may be configured to dynamically arrange an alarm zone within said detection coverage range using real time information provided by said transponder receiver, whereby the alarm zone may move together with a collision object that is approaching a runway or taking off.

The one or more processors of the system of the first aspect of the invention may comprise
a bird detection processor configured for receiving input from said one or more radar systems and said transponder receiver and providing warning or alarm signals to application interfaces, such as machine interfaces or user interfaces.

Here, the bird detection processor may comprise a bird monitor configured to receive raw data from said one or more radars systems and from said transponder receiver, said bird monitor being provided with an image processor for processing the raw data provided by the one or more radars, thereby providing image processed data, and the bird monitor may further be provided with a plot detection and definition processor analyzing the processed data thereby providing radar plots. The bird monitor may be configured to select parameters from the received transponder data and thereby provide transponder plots, and the bird monitor may further be configured to combine data of the radar plots with data of the transponder plots to create tracks. The bird monitor may be configured to perform a match of data of radar plots and data of transponder plots to determine if a plot based on data from the radar systems can be merged with a plot based on data provided by the transponder receiver to obtain a track, if different plots based on data from the radar systems can be merged to obtain a track, and if different plots based on data provided by the transponder receiver can be merged to obtain a track. The bird monitor may also be configured to assign properties of matching plots to the corresponding track, and to perform a classification of obtained tracks to thereby determine if a track is a bird track or a collision object track. It is preferred that the bird detection processor further comprises a bird analysis block configured to receive data related to said tracks and/or to receive data provided by said assigning and classifying means, and configured to provide post processing of such data in relation to one or more interface applications. It is preferred that at least one of the post processing means is configured to calculate a collision risk level or a collision probability of tracks. The collision risk level or collision probability may relate to whether a collision object track, which is determined based on the data provided by the transponder receiver, interferes with a bird track, or to whether a radar based collision object track interferes with a bird track, or to whether a collision object track based on a combination of data from said radars and from said transponder receiver interferes with a bird track. The avian detecting system according to first aspect of the invention may comprise a database for receiving data provided by said bird monitor and providing such data to said bird analysis block. The bird monitor also can provide data directly to the bird analysis block. Thus, the bird analysis block may receive data from either the bird monitor or the database, or from both the bird monitor and the database.

According to the first aspect of the invention there is also provided a method in an avian detection system for determining risks of collision between a collision object, such as an air plane, and bird objects that may pose a collision risk with the collision object, the method comprising:
obtaining first type of information data corresponding to one or more objects being detected by the avian detection system;
providing radar plots based on the first type of information data;
obtaining transponder data corresponding to one or more collision objects;
providing transponder plots based on the transponder data;
comparing data of obtained plots;
creating and storing a number of object tracks based on the provided radar plots and transponder plots, each track holding object data corresponding to or determined from data of matching plots; and
determining one or more risks of collision or collision risk levels for at least one collision object based on object data of a plurality of the obtained object tracks.

The method of the first aspect of the invention may further comprise:
determining based on stored object data of an obtained track whether the track is a bird track or a collision object track, where a determined collision object track represents a corresponding collision object; and determining the one or more risks of collision or collision risk levels for the at least one collision object based on object data of one or more bird tracks and the corresponding collision object track(s).

According to the method of the first aspect of the invention there is also provided a method in an avian detection system for determining risks of collision between a collision object, such as an air plane, and bird objects that may pose a collision risk with the collision object, the method comprising:

obtaining first type of information data corresponding to one or more objects being detected by the avian detection system;

providing radar plots based on the first type of information data;

obtaining transponder data corresponding to one or more collision objects;

providing transponder plots based on the transponder data;

comparing data of obtained plots;

creating and storing a number of object tracks based on the provided radar plots and transponder plots, each track holding object data corresponding to or determined from data of matching plots;

determining based on the stored object data of an obtained track whether the track is a bird track or a collision object track, where a determined collision object track represents a corresponding collision object; and determining one or more risks of collision or collision risk levels for at least one collision object based on object data of one or more bird tracks and the corresponding collision object track(s).

For the method of the first aspect of the invention the step of determining one or more risks of collision or collision risk levels may comprise determining a risk or probability of collision between a collision object and a bird object based on object data of the object tracks representing the collision object and the bird object, which can be a bird track and a collision object track. The step of determining one or more risks of collision or collision risk levels may further comprise determining a severity of such a collision based at least partly on object data of an object track representing the bird object, which can be the bird track, and determining the collision risk level based on the obtained risk or probability of collision and the obtained severity of the collision.

The method of the first aspect of the invention may also comprise a visualization one or more of the created objects tracks via a monitor or visualizer.

For the method of the first aspect of the invention it is preferred that the avian detection system comprises one or more avian radar systems for detecting objects and providing the first type of information data. It is also preferred that the avian detection system comprises at least one transponder receiver for providing the transponder data. Here, the transponder data may be transmitted or broadcasted by one or more transponders provided at one or more corresponding collision objects, and the transmitted transponder data may be received by the transponder receiver.

For the method of the first aspect of the invention it is preferred that the avian detection system comprises one or more processors for:

receiving the obtained first type of information data and the obtained transponder data;

providing the radar plots based on the first type of information data;

providing the transponder plots based on the transponder data;

comparing data of the obtained plots;

creating and storing the number of object tracks based on the provided radar plots and transponder plots, with each track holding object data corresponding to or determined from data of the matching plots;

determining based on the stored object data of an obtained track whether the track is a bird track or a collision object track, where a determined collision object track represents a corresponding collision object; and determining the one or more risks of collision or collision risk levels for the at least one collision object based on object data of the one or more bird tracks and the corresponding collision object track(s).

For the method of the first aspect of the invention where the avian system comprises one or more processors, the one or more processors may further be configured for determining a risk or probability of collision between a collision object and a bird object based on object data of the bird track and the collision object track;

determining a severity of such a collision based at least partly on object data of the corresponding bird track; and determining the collision risk level based on the obtained risk or probability of collision and the obtained severity of the collision.

For the method of the first aspect of the invention it is preferred that the avian detection system comprises a monitor or visualizer, and the one or more processors are further configured for visualizing one or more of the created objects tracks via said monitor or visualizer.

It is preferred that the method of the first aspect of the invention further comprises:

storing a number of radar plots and transponder plots based on successively received first type of information and successively received transponder data;

comparing data of a number of the stored plots; and creating one more object tracks based on data of a plurality of the stored plots when predetermined matching conditions are fulfilled for corresponding data of said plurality of stored plots.

It is also preferred that the method of the first aspect of the invention comprises: providing updated radar plots and transponder plots based on received updated first type of information and received updated transponder data;

comparing data of an updated plot with data of stored tracks; and updating data of a stored track when predetermined matching conditions are fulfilled for corresponding data of the stored track and the updated plot. The method may further comprise the steps of determining one or more updated risks of collision or collision risk levels for the at least one collision object when one or more tracks are updated.

For the method of the first aspect of the invention the first type of information data may comprise data representing position or location and size of detected objects, and a radar plot may hold position or location and size data obtained from the received first type of information relating to the corresponding detected object. The method may then hold the step of determining speed and direction of movement of an object detected by the avian radar system(s) based on a plurality of radar plots holding position and size data obtained from successively received first type of information relating to said detected object.

For the method of the first aspect of the invention a transponder plot may hold at least part of the transponder data of a corresponding collision object, where the transponder data represents all or part of the following: position or location, altitude, direction of movement, speed, type or ICAO code, and status of the collision object.

For the method of the first aspect of the invention it is preferred that the predetermined matching conditions to be fulfilled between data of the stored plots for creating an object track at least comprise a match between position data of the plots. The predetermined matching conditions to be fulfilled between data of the stored plots may further comprise a match between size data and/or a match between type of collision object data or ICAO data of the plots. The predetermined matching conditions to be fulfilled between data of the stored plots may also comprise a match between speed data and/or a match between direction of movement data determined from the plots.

For the method of the first aspect of the invention it is preferred that when comparing data of a stored track with data of a plot or updated plot to update the stored track, then the predetermined matching conditions to be fulfilled at least comprise a match between position data of the track and the plot. The predetermined matching conditions to be fulfilled between data of the stored track and the updated plot may further comprise a match between size data, type of collision object data or ICAO data of the track and the plot. The predetermined matching conditions to be fulfilled between data of the stored track and the updated plot may also comprise a match between speed data and/or a match between direction of movement data.

For the method of the first aspect of the invention it is preferred that a match condition is fulfilled for a set of corresponding data based on a predetermined threshold difference between the data being matched.

It is within one or more embodiments of the method of the first aspect of the invention that the step of determining whether an obtained track is a bird track or a collision object track is based at least partly on stored track data representing size of object and/or type of collision object or ICAO code of collision object. The step of determining whether an obtained track is a bird track or a collision object track may further be at least partly based on stored track data representing speed of the object. The method of the first aspect of the invention may also comprise a step of determining sinuosity of a movement curve for an object represented by a track, and further comprise determining whether an obtained track is a bird track or a collision object track based at least partly on stored track data representing sinuosity of the object.

The method of the first aspect of the invention may further comprise a step of classifying a determined bird track and a determined collision object track as belonging to a certain classification class. The classification of a determined bird track may be based on stored track data representing size of the object, and classification of a determined collision object track is based on stored track data representing size of object and/or type of collision object or ICAO code of collision object. Classification classes of a detected bird may comprise: large bird, medium bird and small bird. Classification classes of a detected collision object may comprise: plane and vehicle.

For the method of the first aspect of the invention the step of determining one or more risks of collision or collision risk levels may comprise determining when a collision object of a collision object track and an object of a bird track are on a collision course based on data of the bird track and the collision object track, and determining a collision risk level for the collision object based on data of the collision object track and the bird track when the collision object and the object of the bird track are on a collision course.

For the method of the first aspect of the invention it is preferred that determination of the risk of collision or the collision risk level for a collision object of a collision object track and an object of a bird track is based at least partly on position data of the collision object track and the bird track.

For the method of the first aspect of the invention determination of the risk or probability of collision between a collision object and a bird object may be based at least partly on position data of the corresponding collision object track and bird track, and the determination of the severity of such collision is based at least partly on size data of the bird track. The determination of the risk or probability of collision between a collision object and a bird object may be based at least partly on speed data and/or direction of movement data of the corresponding collision object track and bird track. The method of the first aspect of the invention may comprise a step of determining sinuosity of a movement curve for an object represented by a track, and further comprise determining the risk or probability of collision between the collision object and the bird object based at least partly on the sinuosity of the corresponding collision object track and/or bird track.

It is within embodiments of the method of the first aspect of the invention that the collision risk level is determined by multiplying a determined risk or probability of collision with a determined severity of the collision.

The method of the first aspect of the invention may comprise a step of generating an alarm or alert when a determined collision risk level exceeds a predetermined risk level.

It is within embodiments of the method of the first aspect of the invention that the avian detection system has a detection coverage range, and that the method further comprises dynamically arranging an alarm zone within said detection coverage range using real time information provided by the transponder data, whereby the alarm zone will move together with a collision object.

According to a second aspect of the present invention there is provided an avian detection system for detecting and tracking birds that may pose a collision risk with a collision object such as an air plane, the system comprising:
one or more avian radar systems providing a first type of information relating to the birds; and
a transponder receiver receiving transponder data (ADS-B) from a collision object;
wherein the avian detection system is configured to combine the first type of information with the transponder data in order to determine, access or evaluate collision risk between a detected and/or tracked bird and a collision object associated with said transponder data.

According to an exemplary embodiment of the second aspect of the invention, the system is configured not to give an alarm when the combined data indicates that there is no collision object nearby a detected and/or tracked bird.

According to an exemplary embodiment of the second aspect of the invention, the system further comprises one or more processors configured to receive the first type of information and the transponder data and to detect and track a bird and to allow the generation of an alarm or alert when a tracked bird is determined to be on a collision course based on said combined avian radar data and transponder data.

According to an exemplary embodiment of the second aspect of the invention, the system comprises one or more processors that are configured to dynamically arrange the alarm zone within the detection coverage range using real time information provided by the transponder receiver, whereby the alarm zone will move together with a collision object that is approaching a runway or taking off.

According to an exemplary embodiment of the second aspect of the invention the system comprises:
a bird detection processor configured for receiving input from the one or more radar systems and the transponder means and providing warning or alarm signals to application interfaces, such as machine interfaces or user interfaces, where the processing device comprises:
a bird monitor configured to receive raw data from the one or more radars and from the transponder receiver and provided with an image processor configured for processing the raw data provided by the one or more radars, thereby providing image processed data, and a plot detection and definition processor analyzing the processed data, thereby providing plots, based on which plots tracks are created, which tracks are combined with data provided by the transponder receiver;
wherein the bird monitor further comprises assigning and classifying means that determines if a track based on the data from the radars can be merged with a track provided by the transponder receiver and provides such merged data to at least one of the post processing means in the bird analysis block;
where the system furthermore comprises a bird analysis block configured to receive data related to the tracks and/or to the merged data provided by the assigning and classifying means and providing such post processing of such data that is necessary in relation to one or more interface applications.

According to an exemplary embodiment of the second aspect of the invention, at least one of the post processing means is configured to calculate the collision probability of tracks.

According to an exemplary embodiment of the second aspect of the invention the collision probability relates to whether a ADS-B track determined based on the data provided by the transponder receiver interferes with a bird, or to whether a radar based track interferes with a bird, or to whether a track based on a combination of data from said radars and from said transponder receiver (i.e. merged data) interferes with a bird.

According to an exemplary embodiment of the second aspect of the invention the system comprises a database for receiving data (merged data or tracks) provided by the bird monitor and configured for providing such data to the bird analysis block.

According to a third aspect of the present invention there is provided an avian detection method for detecting and tracking birds that may pose a collision risk with a collision object such as an air plane, the method comprising:
(i) using one or more radars for providing a first type of information relating to the birds;
(ii) using transponder means for receiving transponder data (ADSB) from a collision object;
(iii) based on the received transponder data defining an alarm zone associated with and moving with the collision object;
(iv) detecting and tracking birds based on the first type of information; and generating an alarm or alert when tracked birds enter the alarm zone.

According to an example embodiment of the method according to the third aspect of the invention, the method comprises storing data provided by the bird monitor in a database and analysing data provided from the database in a bird analysis functional block.

According to an example embodiment of the method according to the third aspect of the invention, the transponder data are stored in the above mentioned database.

According to an example embodiment of the method according to the third aspect of the invention, the transponder data is used for continuously updated collision probability analysis.

According to an example embodiment of the method according to the third aspect of the invention, the transponder data are imported to the above mentioned bird monitor and merged with the existing radar track data either before or in the tracker function. The merged data can be displayed in real time on display means, and these merged data will contain more detailed information than the above mentioned horizontal radar track data.

In a specific embodiment of the system and method according to third aspect of the invention, information provided by one or more cameras may be used to provide further details relating to the birds.

Further objects, features, advantages and properties of the systems and methods according to the disclosure will become apparent from the detailed description.

BRIEF DESCRIPTION OF THE DRAWINGS

In the following detailed portion of the present invention, the invention will be explained in more detail with reference to the example embodiments shown in the drawings, in which.

DETAILED DESCRIPTION OF THE INVENTION

The following detailed description relates to specific, but non-limiting, example embodiments of the invention. An embodiment of the invention comprises an avian detection system for detecting and tracking birds that may pose a collision risk with a collision object such as air traffic. The avian detection system may have a static coverage range. It would however also be possible to use non-static coverage ranges that might for instance adapt to certain specific dynamic conditions at the site of application of the detection system and embodiments applying such non-static coverage ranges will also fall within the scope of the present invention.

It is within an embodiment of the invention that the avian detection system comprises one or more processors, which may be configured to detect and track a bird based at least partly on information provided by one or more avian radar systems detecting objects, such as birds. The one or more processors may be configured to generate an alarm or alert when a tracked bird enters an alarm zone inside said static (or non-static) detection coverage range.

The above mentioned one or more processors may be configured to dynamically arrange the alarm zone within the detection coverage range using real time information. The real time information may relate to a detected bird, to weather conditions, to the collision object, such as an air plane, or to specific user characteristics.

It is within embodiments of the invention that the one or more processors may be configured to determine the size and/or shape and/or location of the alarm zone based on real time information relating to a detected bird and/or relating to an object that is at risk of colliding with a bird and/or relating to weather conditions or to specific user characteristics.

According to embodiments of the invention, the alarm zone may move together with planes that are approaching a runway or taking off. This may lead to a situation where alarms are only generated when there is a plane on collision course. For these calculations integration of transponder data of planes (such as ADS-B data) may be required. Transponder data may give information of location, type and speed of planes and/or vehicles. According to embodiments of the invention, transponder data can be used for collision probability analysis. The collision probability analysis may be updated when new transponder data are received.

Figure 1:
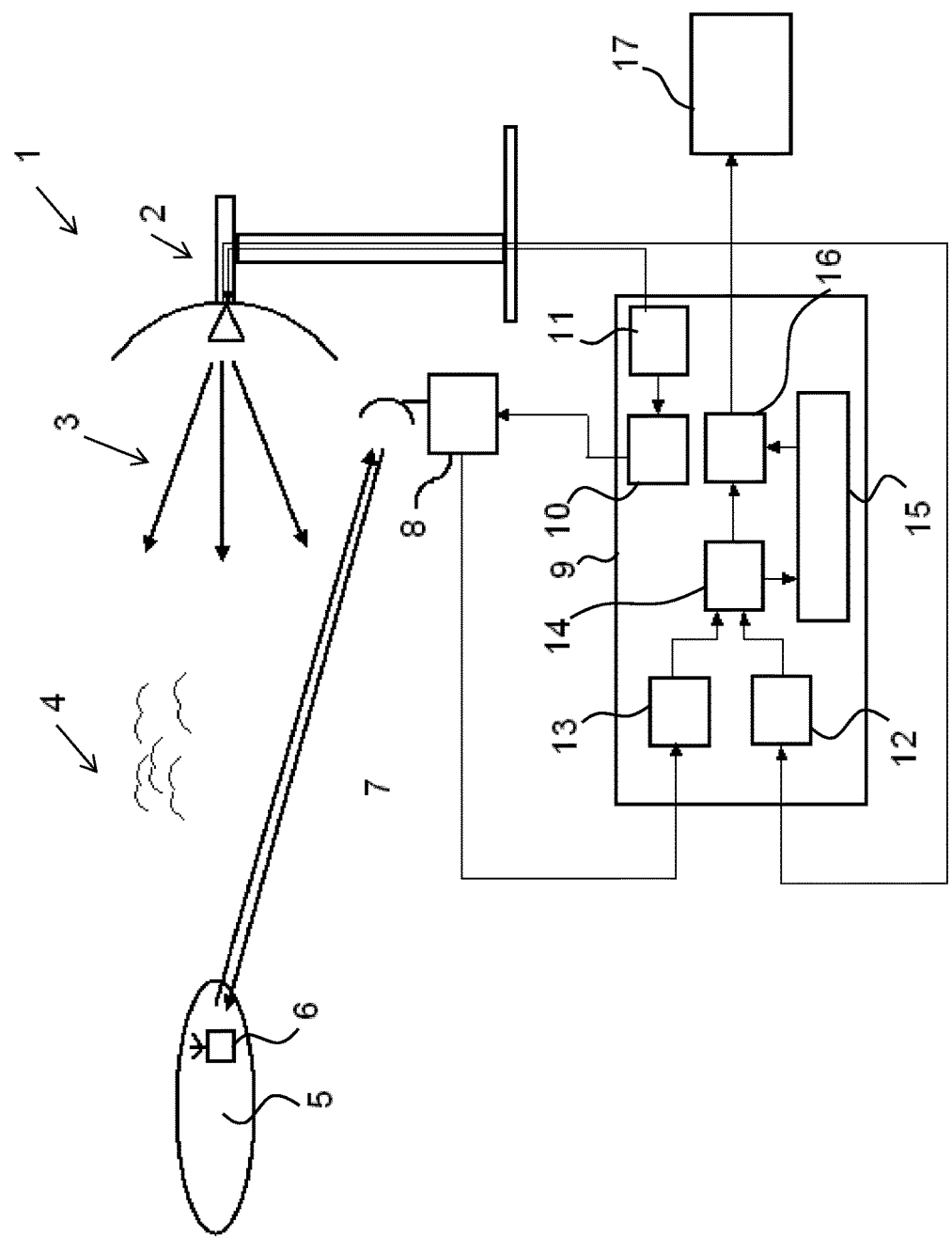
FIG. 1 is a schematic block diagram illustrating the basic structure of an example embodiment of a system according to the present invention.

Referring to FIG. 1 there is shown a schematic block diagram illustrating the basic structure of an example embodiment of the present invention.

The avian detection system according to an example embodiment of the invention is generally indicated by reference numeral 1. The system comprises basically a radar system or avian radar system 2 emitting radar signals 3 and receiving reflections from for instance a flock of birds 4 that may pose a collision risk for an aircraft 5 that for instance approaches a runway on an airport. The aircraft 5 is provided with a transponder 6. The transponder 6 broadcasts an interrogation signal to a transponder 8 associated with the system 1 and the transponder 8 receives a signal emitted from the transponder 6 in the aircraft based on which the position of the aircraft relative to the system can be determined. The radar system 2 and the system transponder 8 may be controlled by control systems schematically indicated as blocks 10 and 11. In a specific embodiment of the invention, only "squawk" information is used. Thus, in this embodiment, information requests are sent by the system 1, but only signals that are sent out at subsequent points in times by the transponder 6 may be picked up.

Figure 2:
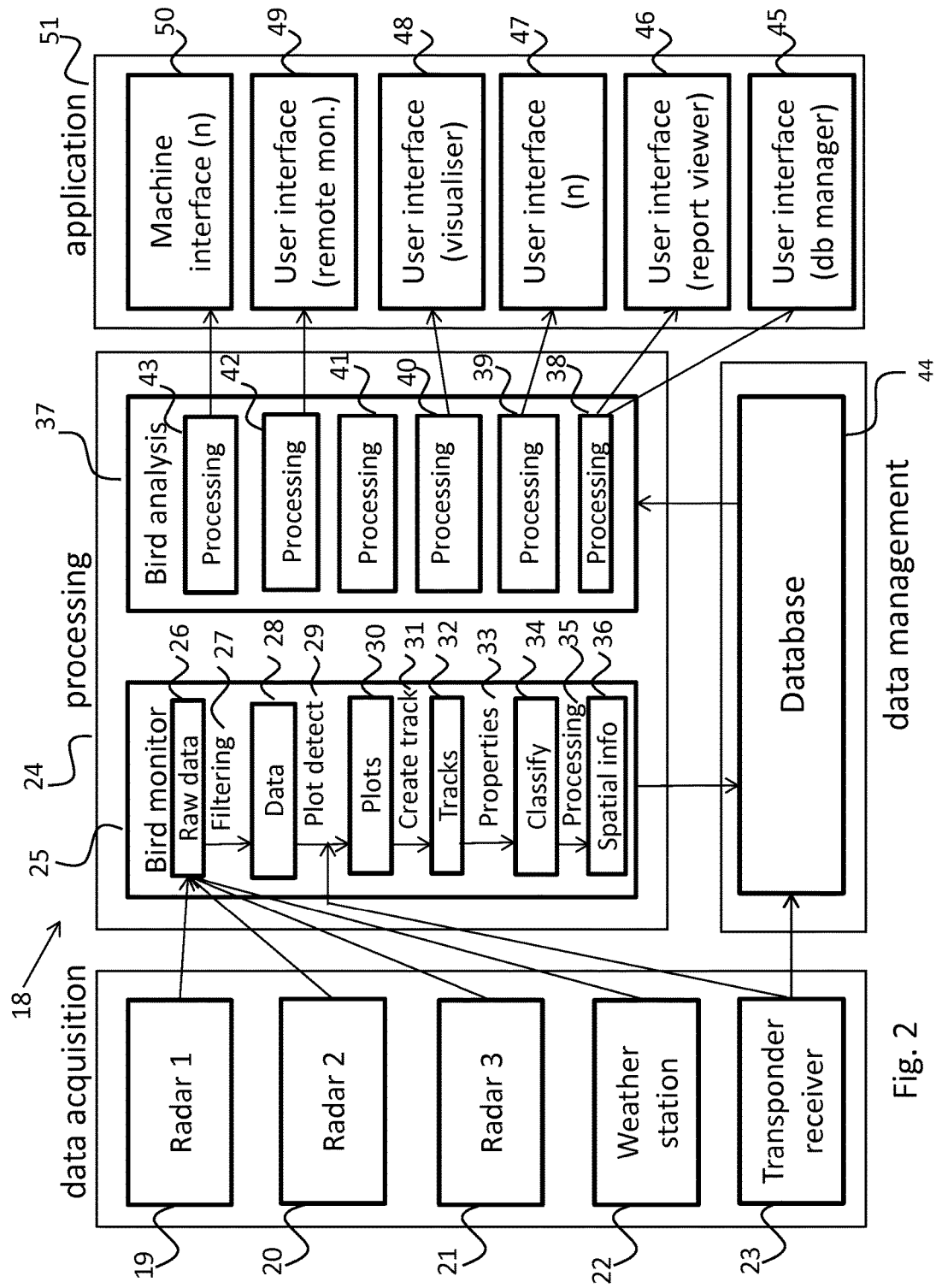
FIG. 2 is schematic block diagram illustrating an avian detection system according to an example embodiment of the present invention.

In FIG. 1 only a single radar antenna 2 is shown, but it is understood that more than one radar antenna or one or more avian radar systems may be used as described in the summary of the invention and in the specific embodiment shown in FIG. 2.

In an embodiment the radar 2 is a 3D radar system that includes an antenna provided with means for varying its effective pointing direction in elevation. A radar transmitter is operatively connected to the antenna for generating a radar signal for emission via the antenna. The radar transmitter transmits pulses of constant width at a constant pulse repetition frequency (PRF) at X-band or S-Band (or other bands). A radar receiver is operatively connected to the antenna, an azimuth scanner operatively coupled to the antenna for rotating same about an axis. One or more processors may be operatively connected to the receiver. A sampling system may digitize the radar return video signal.

The processor(s) may be configured for detecting and localizing objects, such as birds 4, in azimuth and range. In an embodiment the processor(s) may further be configured for estimating a height of a detected object or bird 4 based on relative amplitudes of echo returns as a function of elevation pointing direction of the antenna.

The radar antenna preferably rotates continuously 360 [deg] in azimuth while transmitting and receiving. The inclination of the radar antenna may be fixed or variable. Signals (raw data) from the radar 2 may be provided to a first processing unit generally indicated by 12 that comprises image processors and filters used for instance to remove signals from rain, ground clutter and moving objects that are not birds. A more detailed description of such processors and filters is given below in connection with FIG. 2.

Signals received by the receiver in the transponder 8 may be provided to a second processing unit 13 that may determine the position of the aircraft 5 based on these signals.

Processed signals, provided by the first and second processors 12 and 13 may be compared in a third processor 14. The processed signals from the first processor 12 may provide information about the presence, position and direction of movement of birds that may pose a collision risk for an aircraft and the processed signals from the second processor 13 may provide information about the location and direction of movement of an approaching aircraft. Based on these processed signals it becomes hence possible to predict a risk of collision between the aircraft and the birds.

Processed signals and predictions based upon these can if desired be stored in a database 15 and retrieved for further analysis.

In functional block 16 it may be decided if an alarm or alert is to be elicited based on the processing carried out in the third processor 14 possibly supplemented with data from the database 15. An alarm or alert can be provided to a remote unit 17 for instance located in a bird control department or a control tower at an airport.

The above system may offer the advantageous possibility to define an alarm zone that moves with the aircraft, which will reduce the number of false alarms that would result from a system without this feature.

Referring to FIG. 2 there is shown a schematic block diagram illustrating an avian detection system 18 according to an example embodiment of the invention.

The system 18 according to this example embodiment comprises a number of data acquisition sensors or transducers 19, 20, 21, 22, 23. These sensors or transducers comprise one or more radars 19, 20, 21. There may be only a single radar, but a network of radars may alternatively be used. The radars can be local radars (S-band/X-band) but also long-range radars may be applied. According to an embodiment, two radars, one vertical and one horizontal are used. The horizontal radar may provide latitude/longitude and size information of the birds, while the vertical radar may provide height information and detailed information like wing beats. Besides radars 19, 20, 21 a number of other sensors can be used to provide relevant data for the system. A weather station 22 may be provided to for instance calculate airspeed (direction and/or wind speed/direction). A transponder receiver 23, corresponding to the transponder 8 of FIG. 1, is provided for forwarding transponder data being transmitted from a transponder of a collision object, such as transponder 6 in the aircraft 5 of FIG. 1. The sensors may provide information to a processing unit 24, which in practice consists of a number of processors (which may depend on number of servers). The information provided by the sensors 19, 20, 21, 22, 23 may have multiple formats, but for the radars 19, 20, 21 it may consist of raw images with radar reflections. The information from the sensors 19, 20, 21 may be provided in the form of raw data for further processing to a bird monitor 25, which is the central part of the processing unit 24.

For the bird monitor 25, the processing has a first step 27, in which filtering is done. This filtering may comprise filtering of rain, ground clutter and moving objects (not being birds). The filters are contrary to prior art filters used in this technical filed fully dynamic. After filtering, the processed data 28 is analysed in order to detect and define 29 radar plots 30, and these plots 30 are searched. A radar plot 30 may be defined as a reflection (location and strength of the reflection) that is most probably a bird and could be part of a track. Data from the transponder receiver 23 is also analysed to define 29 transponder plots 30. The transponder plots and the radar plots (of multiple radars) are used to generate 31 3D tracks 32, and the strength of plots may be used to classify the tracks. The tracker that can be used is a tracker developed by the applicant as a tool that uses multiple tracking algorithms like Kalman filtering. The tracks may hold a combination of data obtained from the radar plots and the transponder plots. However, a track may also hold data obtained only from radar plots or obtained only from transponder plots.

If an obtained track is based on data from radar plots being merged with data from a transponder plot, which data is provided via the transponder receiver 23 (i.e. provided by the ADS-B system), i.e. that the same object can be seen by both systems, the obtained track gets an extra property consisting of the transponder plot data (i.e. ADS-B information, Automatic Dependent Surveillance-Broadcast information), when compared to a track based on radar plots only. The collision probability of tracks can be calculated in one of the post processing steps 38 to 43. It can for instance relate to a collision object track (i.e. ADS-B track) that interferes with a bird track, or to a track based on radar plots only that interferes with a bird track, or to a so called "combined" track that interferes with a bird track.

The information provided by the bird monitor 25 may then be stored in a database 44 (PostgreSQL or MySQL). This database 44 is preferably located on a separate server, with powerful data management/back-up facilities.

The second part of the processing unit 24 is the bird analysis part 37. In this part data may be post processed (blocks 38 through 43) for different kind of interfaces. The most common ones are a visualizer 48 (real time monitoring), a remote monitor 49 (operator interface) and a report viewer 46 (data base analysis). Other interfaces are a database manager interface 45, a general user interface 47, and a machine interface 50. The output of the bird monitor 25 may be processed in such a way that data becomes available for interfacing tools in a light and standard communication protocol. All processing may be done in the bird analysis module 37, whereas the applications 51 themselves may only have to do the visualisation and user-interaction.

The applications 51 can vary a lot, since there are different kind of users (end users, operators, maintenance and support) and these groups may have different requirements per market: ATC versus avian control.

A number of important advantages may be obtained by the system and method according to the present invention. Some of these have been mentioned in the summary of the invention, and furthermore, the application of the transponder data (i.e. ADS-B system data) according to the invention may reduce the number of alarms and only the relevant ones remain. The system may calculate a specific zone for each track and collision object (e.g. plane) and refreshes/recalculates it at every radar or transponder update.

Different processing steps performed in accordance with embodiments of the system and method of the present invention are discussed in the following and illustrated in connection with FIGS. 3-7.

Figure 3:
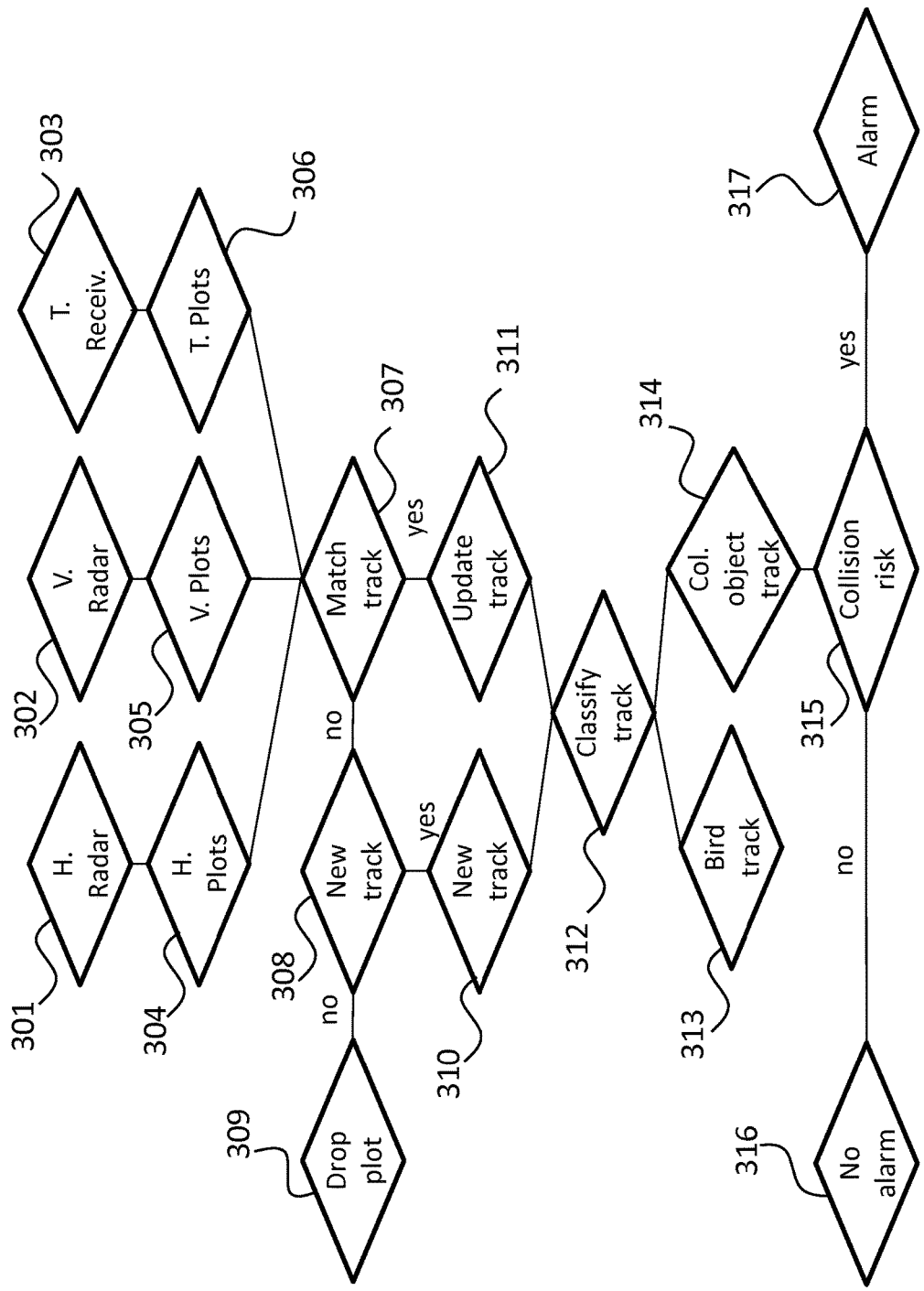
FIG. 3 shows an overview flow diagram of a method for determining a collision risk according to an embodiment of the present invention.

FIG. 3 shows an overview flow diagram of a method for determining a collision risk according to an embodiment of the present invention. A horizontal avian radar system 301 is provided, and horizontal radar plots 304 are obtained based on data or first type of information data relating to objects detected by the horizontal radar system 301. A vertical avian radar system 302 is also provided, and vertical radar plots 305 are obtained based on data or first type of information data relating to objects detected by the vertical radar system 302. A transponder receiver 303 is provided and transponder plots 306 are obtained based on transponder data transmitted from one or more transponders of corresponding collision objects.

New data are regularly provided by the radar systems 301, 302 and the transponder receiver 303, and corresponding new or updated radar plots 304, 305 and transponder plots 306 are obtained. New horizontal radar data may be provided at regular intervals, such as intervals of or about 1.3 seconds, and new vertical radar data may be provided at regular intervals, such as intervals of or about 3 seconds, while new transponder data may be provided at intervals which may be a bit random, with intervals in the range of 2-4 seconds.

The obtained plots 304, 305, 306 are compared in order to create and store a number of object tracks. When a new plot is provided, then the first step is to try to match the new plot with an already existing object track 307. If there is a match to an existing object track, then the data of the matched track is updated with data of the new track to obtain an updated or extended object track 311. If there are no existing tracks, or there is no match to any of the existing tracks, then the new plot is stored in order to be matched with other plots to create a new track 308, 310. If there is not obtained a match to other plots within a predetermined time frame T, such as a time frame of about 10 seconds, then the plot is dropped or discarded 309. If there is a match to other plots, a new track or object track is created based on the matching plots 310. The obtained tracks 310 or updated tracks 311 are stored, and a stored track holds object data corresponding to or determined from data of the matching plots used for creating the track.

The obtained object tracks are classified, 312, as being either a bird track 313 or a collision object track 314, where a track determined or classified as a collision object track represents a corresponding collision object. The classification 312 is based on stored object data of the obtained tracks.

Collision risks for a collision between the collision object of a collision object track and the objects or birds of the bird tracks are determined 315, based on object data of the bird tracks and data of the collision object track. Determination of a collision risk may include determination of a collision risk level, giving a measure of the severity of a collision and the probability of a collision. If a determined collision risk or collision risk level is above or equal to a predefined level, an alarm may be issued 317, and if the collision risk or collision risk level is below the predefined level, no alarm need to be issued 316.

Figure 4:
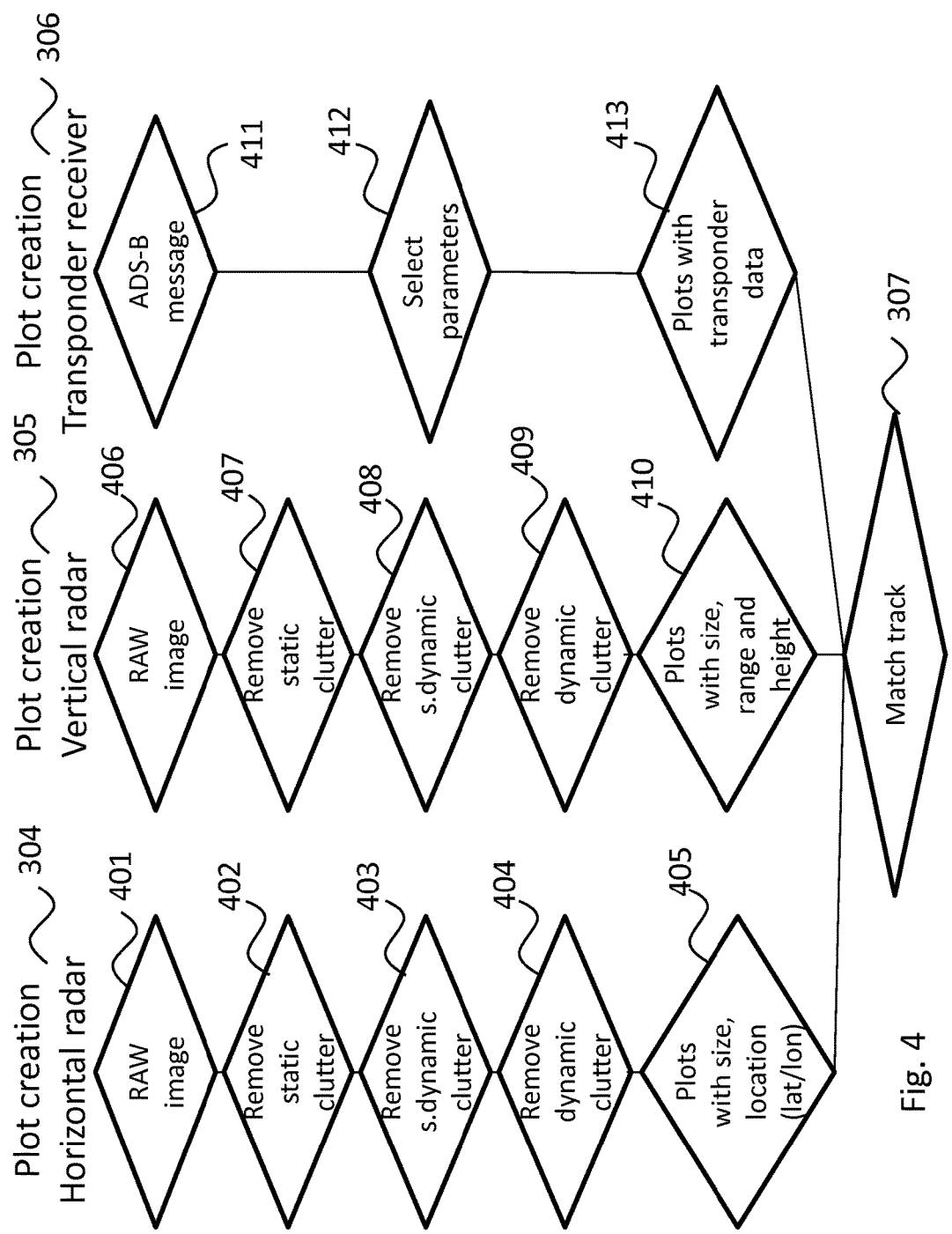
FIG. 4 shows a flow diagram of a method for providing radar plots and transponder plots according to an embodiment of the present invention.

FIG. 4 holds a flow diagram illustrating a method according an embodiment of the invention for providing or creating radar plots and transponder plots, such as the radar plots 304, 305 and the transponder plots 306 of FIG. 3.

For the horizontal radar plots 304, raw image data 401 is obtained when the horizontal radar 301 detects an object. The raw data 401 is processed and filtered to remove clutter, where static clutter, such as clutter provided by buildings, can be removed 402 based on raw data, which has been obtained within the last couple of hours. Semi dynamic clutter, such as clutter provided by falling leaves, can be removed 403 based on raw data, which has been obtained within the last minutes. Dynamic clutter, such as clutter provided by rain, can be removed 404 based on raw data, which has been obtained from the last received images. The final obtained horizontal plot 405 holds size data and location data of the detected object, where the location data comprises latitude and longitude data of the object. The obtained plots 405 may be used to create or update tracks, see steps 307 and 308 of FIG. 3.

For the vertical radar plots 305, raw image data 406 is obtained when the vertical radar 302 detects an object. The raw data 406 is processed and filtered to remove clutter in processes similar to the processes for the horizontal radar date. Thus, static clutter can be removed, 407, semi dynamic clutter can be removed 408, and dynamic clutter can be removed 409. The final obtained vertical plot 410 holds size data, location data in the form of range data, and height data of the detected object. The obtained plots 406 may be used to create or update tracks, see steps 307 and 308 of FIG. 3.

For the transponder plots 306, transponder data 411, which can be in the form of an ADS-B message being transmitted from a transponder of a collision object, is received by the transponder receiver 303. The relevant parameters of the received transponder data or ADS-B message are selected 412, to obtain a transponder plot 413 holding data which may represent all or part of the following: location, height, direction of movement, speed, type or ICAO (International Civil Aviation Organization) code and status of the collision object. The obtained plots 413 may be used to create or update tracks, see steps 307 and 308 of FIG. 3.

Figure 5:
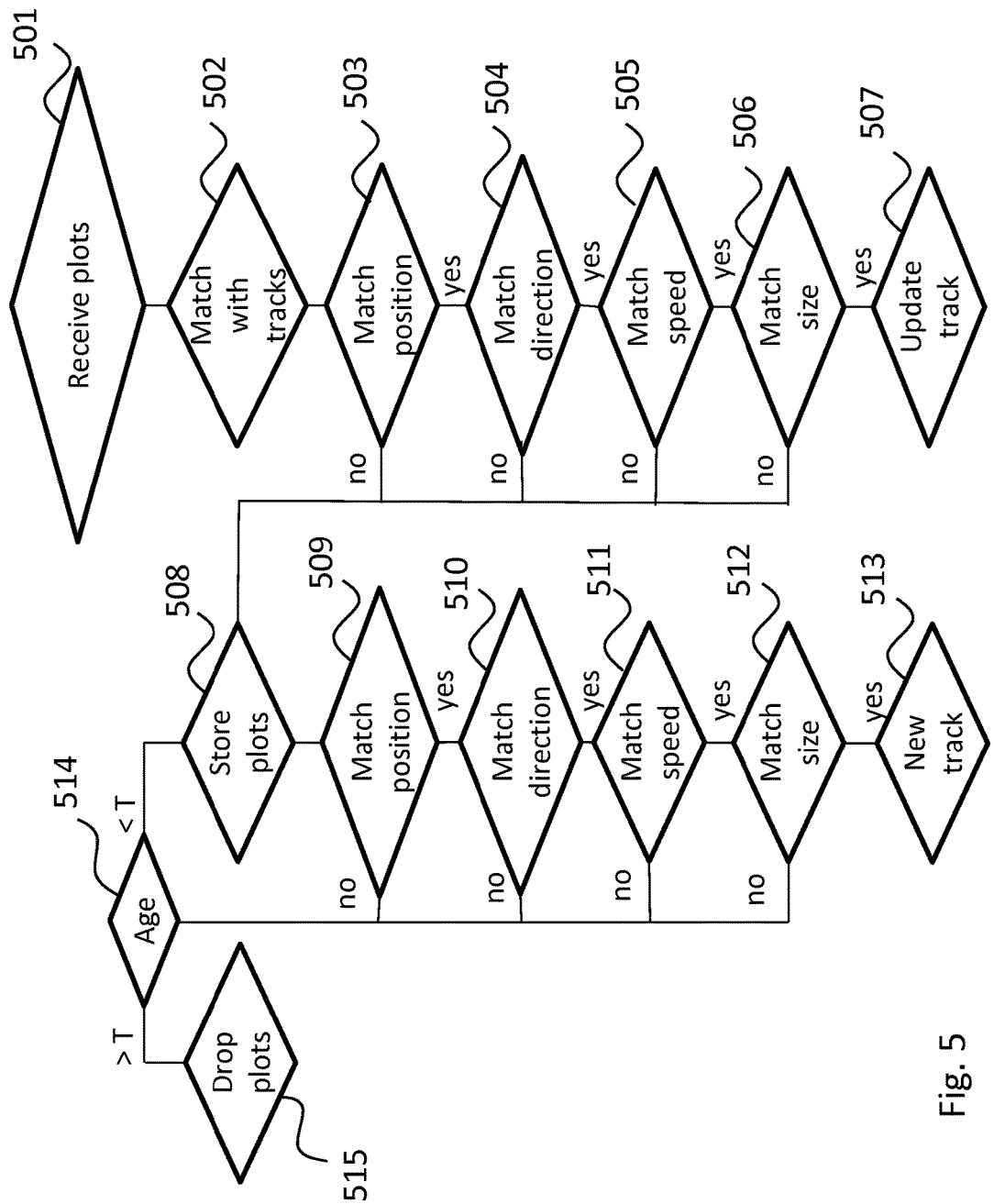
FIG. 5 shows a flow diagram of a method for creating object tracks based on obtained radar and transponder plots according to an embodiment of the present invention.

FIG. 5 holds a flow diagram illustrating a method according to an embodiment of the invention for creating object tracks, such as the tracks 310, 311 of FIG. 3.

In FIG. 5 the obtained radar plots 304, 305 and transponder plots 306 are received at 501. The received plots holds object data or information as mentioned above in connection with the discussion of FIG. 4. When a plot is received at 501, the data of the received plot is compared or matched with the data of stored tracks 502. The first data to be matched at 503 is position or location data, including range and latitude and longitude data for vertical and horizontal radar plot data. If there is no match between position/location data, which will also be the case when there are no stored tracks, the plot data of the received plot is stored at 508.

When two or more plots are received and stored at 508, the data of the stored plots is matched in order to create a new track. The first matching step 509 corresponds to the matching step 503, where position/location data is matched. If there is no match, the age of the plot may be determined 514, and if the plot is older than given by a predetermined time frame T, such as about 10 seconds, the plot is discarded or dropped at 515. If the plot is younger than the time T, the plot is maintained as a stored plot at 508. If there is a match of position data at 509, then the next step is a match of direction of movements of object of the plots. Received radar plots may not hold direction data, and if there is no match between direction data due to lack of such data, the matching proceeds to a match of speed data at 511. If two matched plots both hold matching direction data then the matching proceeds to step 511, and if there is no match between the direction data, then the plots goes to step 514, from where the plot goes to 515 or 508.

Received radar plots may not hold speed data, and if there is no match between speed data due to lack of such data, the matching proceeds to a match of size data at 512. If two matched plots both hold matching speed data then the matching proceeds to step 512. If there is no match between the speed data, then the plots goes to step 514, from where the plot goes to 515 or 508.

All received plots hold size data, where for transponder plots the size data may be represented by classification data giving the type of a collision object or an ICAO code of a collision object. If two matched plots have matching size data, then the matching proceeds to step 513, where a new track is created holding object data of the matched plots. If there is no match between the size data, then the plots goes to step 514, from where the plot goes to 515 or 508. It is preferred that a new track 513 is based on at least four matching plots.

When a new track has been created at 513, the track is stored and will be matched with new incoming or received plots at 502. Here, the first data to be matched at 503 is position or location data, including range and latitude and longitude data for vertical and horizontal radar plot data. If there is no match between position/location data, the plot data of the received plot is stored at 508. If there is a match of position data at 503, then the next step is a match of data for direction of movements of the objects 504. Received radar plots may not hold direction data, and if there is no match between direction data due to lack of such data, the matching proceeds to a match of speed data at 505. If there is a match of direction data of the track and plot being matched then the matching proceeds to step 505, and if there is no match between the data of direction, then the plot is stored at 508. Received radar plots may not hold speed data, and if there is no match between speed data due to lack of such data, the matching proceeds to a match of size data at 506. If there is a match of size data of the track and plot being matched then the matching proceeds to step 507, and the track being matched is updated with data of the matching plot. If there is no match between the size data, then the plot is stored at 508.

It is preferred that the determination of when a match condition is fulfilled for a set of corresponding plot data or a set of corresponding plot and track data is based on a difference measure of values representing the data being matched, where the difference measure may be smaller than a predetermined threshold difference.

Received radar plots hold data representing position or location of the detected objects, but data for direction of movement and speed may not be directly available from the radar plots. When a number of matching radar plots has been received, the matching plots may be part of a track, and based on position/location data of a number of received or successively received plots of the same track, data for direction of movement and/or speed can be determined for the object of the track. The track can now be updated to also include data for direction of movement and/or speed. It is preferred that calculation or determination of data for direction of movement and/or speed is based on at least 4 or 5 received or successively received plots.

Figure 6:
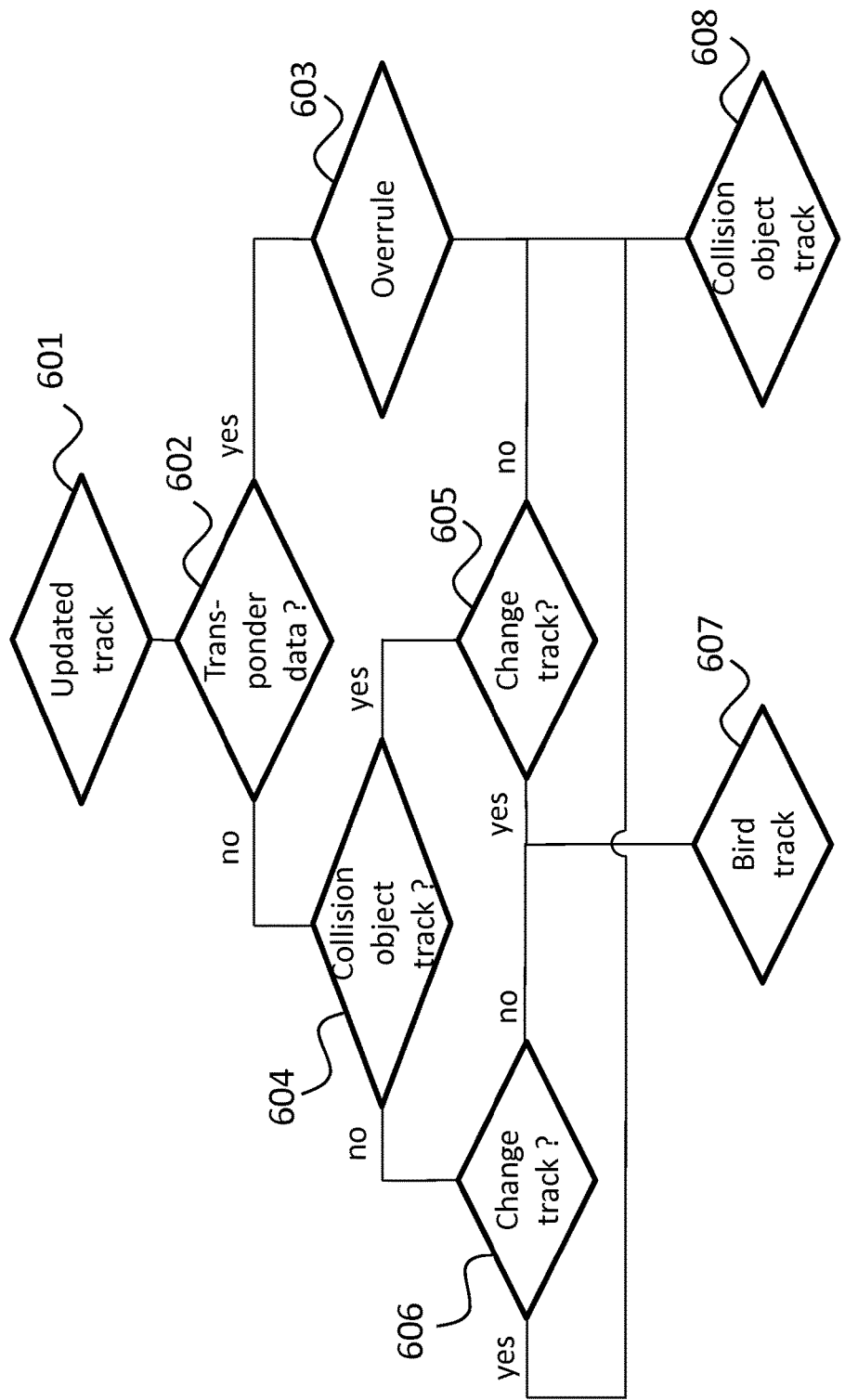
FIG. 6 shows a flow diagram of a method for classifying obtained object tracks according to an embodiment of the present invention.

FIG. 6 shows a flow diagram illustrating a method according to an embodiment of the invention for classifying obtained object tracks. The method illustrated in FIG. 6 may be used in the classifying step 312 of FIG. 3.

A new or updated track holding new plot data is received 601, and it is determined if the new data of the track originates from received transponder data or ADS-B data, and if yes, then any previous classification is overruled 603 and the track is classified as a collision object track 608. If the new data of the track does not originate from received transponder data or ADS-B data, then it is determined if the track is already tagged or classified as a collision object track 604. If it is a collision track, then it is determined if the new data gives reason to change the classification of the track 605. If there is no reason for changing the track the track is maintained as a collision object track 608. If the new data gives reason to change then the track is re-classified as a bird track.

When it is determined at 604 that the track is not tagged or classified as a collision track, the track can by tagged or classified as a bird track, if not already classified as a bird track, and then it is determined if the new data gives reason to change the classification of the track 606. If there is no reason for changing the track the track is maintained as a bird track 608. If the new data gives reason to change then the track is re-classified as a collision object track.

A track may hold data received from matching transponder plots only, and here the last received data originates from transponder data or ADS-B data, and the track is classified as a collision object track, following steps 602, 603 to 608.

It is noted that radar plots may also be obtained from collision objects, from which collision objects no transponder plots are received. Thus, a track based on radar plots only, can both be a bird track and a collision object track. A track may hold data received from matching radar plots only, and here the last received data originates from radar plots, and the track may be classified as a bird track, following steps 602, 604, 606 to 607, or classified as a collision object track, following steps 602, 604, 606 to 608. Here it is decided or determined at step 606 whether the track is a bird track or a collision object track.

A track may also be a combined track holding matching data from both radar and transponder plots. If the last received data originates from transponder data or ADS-B data, then the track is classified as a collision object track, following steps 602, 603 to 608. If the last received data originates from radar plots, and if the track is already tagged as a collision object track, then the track may still be classified as a collision object track, following steps 602, 604, 605 to 608, or the track may be re-classified as a bird track, following steps 602, 604, 605 to 607. If the track is not tagged as a collision object track, then the track may be classified as a bird track, following steps 602, 604, 606 to 607, or classified as a collision object track, following steps 602, 604, 606 to 608.

In step 602 is has to be determined whether or not the last received data originates from transponder data or ADS-B data. If the new track data includes classification data giving the type of collision object or an ICAO code of a collision object, then the data originates from transponder data or ADS-B data, and the track is classified as a collision object track.

For both steps 605 and 606 it has to be decided or determined, whether a track is a bird track or a collision object track. This decision is made based on the stored object data of the track. The size of a bird or flock of birds will usually be much smaller than the size of a collision object, thus the determination of whether an obtained track is a bird track or a collision object track may in a first step be based on track data representing size of the tracked object.

It is noted that a bird track can represent a single bird or several birds, such as a flock of birds, and the size data of a bird track can represent a single bird, several birds or the size of a flock of birds.

There may be a great difference in the speed of a bird or a flock of birds when compared to the speed of a collision object, thus the determination of whether an obtained track is a bird track or a collision object track may also be based on speed data for the tracked object.

For tracks holding data for direction of movement, it may be possible to determine the sinuosity of a track, where sinuosity can be determined by measuring the change in direction of movement per timeframe. There may be a great difference in the sinuosity of a bird or a flock of birds when compared to the sinuosity of a collision object, where a collision object will usually follow a more straight line of movement. Thus the determination at step 606 of whether an obtained track is a bird track or a collision object track may also be based on sinuosity data for the tracked object Although not shown in FIG. 6 the classification of the tracks may further comprise a classification of a bird track based on stored track data representing size of the object, and to classify a determined collision object track based on stored track data representing size of object and/or type of collision object or ICAO code of collision object. The classification classes of a bird track may comprise: large bird, medium bird and small bird. The classification classes of a collision object track may comprise: plane and vehicle.

Figure 7:
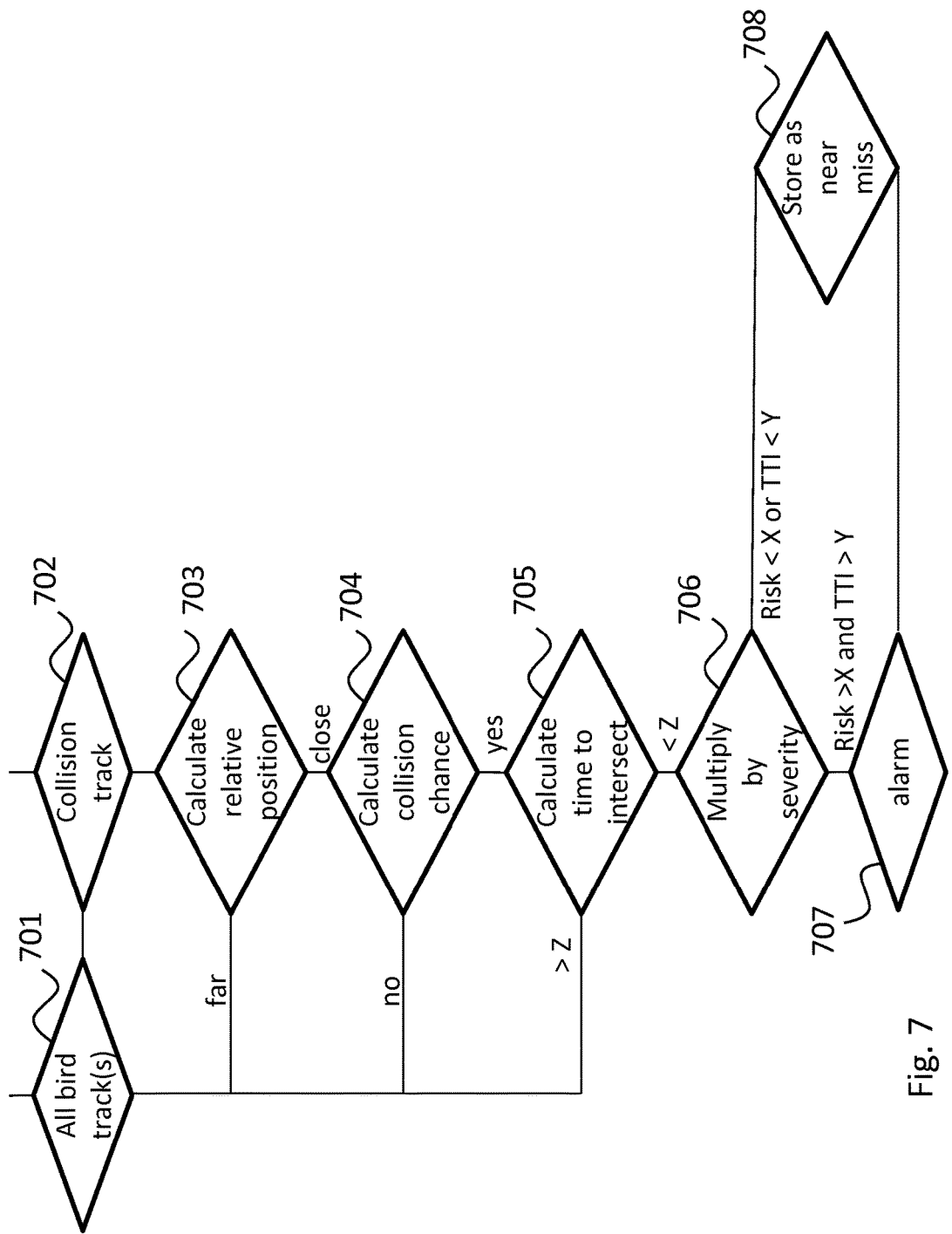
FIG. 7 shows a flow diagram of a method for determining a collision risk for a collision object of an obtained collision object track according to an embodiment of the present invention.

FIG. 7 shows a flow diagram illustrating a method according to an embodiment of the invention for determining a collision risk for a collision object of an obtained collision object track. The method illustrated in FIG. 7 may be used in the collision risk step 315 of FIG. 2.

In order to determine a collision risk for a collision object, such as an air plane, the corresponding collision object track is selected at 702, and the obtained bird tracks are selected 701. Data of the collision object track are compared with corresponding data of the bird tracks to first determine the risk or probability of a collision between the collision object and any bird of a bird track. The data of each bird track may be compared with the data of the collision object track.

First the position or location data of a bird track is compared with the position or location data of the collision object track in order to calculate the relative positions of the bird(s) and the collision object 703. If the bird(s) are far away, no more calculations are done for this bird track, but if the bird(s) are close, a chance of collision is calculated 704. The chance of collision may be calculated based on position data and/or direction of movement data. If sinuosity data are available, such data may also be used in calculating the chance of collision. If there is no chance of collision, no more calculations are done for this bird track, but if there is a chance for collision, a time Z for intersection of the collision object with the bird(s) is calculated 705. If the calculated time for intersection is higher than a predetermined period of time, such as for example 120 seconds, no more calculations are done for this bird track, but if the time for intersection is below this period of time, further calculations are done for the bird track at 706.

In step 706 the collision chance, which has been calculated at 704, is multiplied by a severity factor in order to obtain a collision risk level. The severity factor may be determined by an estimated weight of the bird(s). The weight is estimated based on the size data of the bird track, where the size data may be based on an obtained radar cross section of the bird.

The collision chance calculated in step 704 may be given as a percentage number ranging from 0-100, and a collision chance above 80% is considered critical. The severity factor may be set in the range of 0 to 1, where a low estimated bird weight, such as 1 kilogram or below, gives a severity factor of 0 and a high estimated bird weight, such as 15 kilogram or above, gives a severity factor of 1. Using these types of calculations the overall risk level may be a percentage number in the range of 0-100.

If the collision risk level obtained from 706 is below a predetermined threshold value X, no alarm is initiated, and the bird track is stored as a near miss track 708. If the collision risk is above or equal to the threshold value X, an alarm is initiated or issued 707. Also at step 706 it may be determined if the calculated time to intersect, TTI, obtained from 705, is below a predetermined minimum time Y, such as for example 60 seconds. If the value of TTI is below Y, then the bird track may also be stored as a near miss track, even if the collision risk level is above the threshold value X. Thus, an alarm may be initiated or issued for the bird tracks, where collision risk level is above or equal to the threshold value X and the time to intersect TTI is above or equal to the minimum intersection time Y.

The reason for not giving an alarm for low values of intersection time TTI is that there is no time for people of staff members to react to an alarm.

Using the above given range of collision chance and severity factor, it is preferred that the predetermined threshold value of the collision risk level is set to a percentage number of 60.

The reason for storing the near missed bird tracks, is that when the number of near missed tracks gets high, the risk of a collision increases for the observed collision object, and an alarm may be initiated or generated. If the collision object is about to take-off or approaching a runway, an alarm may be generated towards the bird control for this runway. If the number of near misses gets higher than a critical number, such as 15, the alarm may be initiated.

Updated risks of collision or collision risk levels may be determined for the collision object when the collision object track is updated or one or more bird tracks are updated.

In the present specification, the term "comprising" as used in the claims does not exclude other elements or steps. The term "a" or "an" as used in the claims does not exclude a plurality.

Although the present invention has been described in detail for purpose of illustration, it is understood that such detail is solely for that purpose, and variations can be made therein by those skilled in the art without departing from the scope of the invention.

The invention claimed is:

1. An avian detection system for determining risks of collision between a collision object, such as an air plane, and bird objects that may pose a collision risk with the collision object, the system comprising:
one or more avian radar systems providing a first type of information data relating to objects detected by the avian radar system(s); and
one or more processors configured to:
receive first type of information data corresponding to one or more detected objects and provide radar plots based on the first type of information data, said first type of information data comprising data representing position and size of detected objects, and with a radar plot holding position and size data obtained from the received first type of information relating to the corresponding detected object; wherein
the system further comprises an Automatic Dependent Surveillance-Broadcast (ADS-B) transponder receiver, the ADS-B transponder receiver receiving ADS-B transponder data transmitted or broadcasted by one or more ADS-B transponders provided at one or more corresponding collision objects; and wherein
the one or more processors are further configured to:
receive the transponder data corresponding to one or more collision objects and provide ADS-B transponder plots based on the transponder data;
create and store a number of object tracks based on the provided radar plots and ADS-B transponder plots, each object track holding object data corresponding to or determined from data of matching plots, with at least part of the object tracks holding a combination of data obtained from both the radar plots and the transponder plots;
classify the obtained object tracks as being either a bird track or a collision object track, where a track classified as a collision object track represents a corresponding collision object, and where the classification of an object track as a bird track is based at least partly on stored data representing size of the object, and the classification of an object track as a collision object track is based at least partly on stored data representing size of the object and/or type of collision object or International Civil Aviation Organization ICAO code of collision object; and
determine one or more risks of collision or collision risk levels for at least one collision object based on object data of one or more bird tracks and the corresponding collision object track(s).

2. An avian detection system according to claim 1, wherein the one or more processors are configured to:
allow generation of an alarm or alert when a determined collision risk level exceeds a predetermined risk level.

3. An avian detection system according to claim 1, wherein the one or more processors are configured to store a number of radar plots and transponder plots based on successively received first type of information and successively received transponder data; and to create one or more object tracks based on data of a plurality of the stored plots when predetermined matching conditions are fulfilled for corresponding data of said plurality of stored plots.

4. An avian detection system according to claim 3, wherein the predetermined matching conditions to be fulfilled between data of the stored plots at least comprise a match between position data of the plots and a match between size data, type of collision object data or ICAO data of the plots.

5. An avian detection system according to claim 1, wherein the one or more processors are configured to provide updated radar plots and transponder plots based on received updated first type of information and received updated transponder data; to compare data of an updated plot with data of stored tracks; to update data of a stored track when predetermined matching conditions are fulfilled for corresponding data of the stored track and the updated plot; and to determine one or more updated risks of collision or collision risk levels for the at least one collision object when one or more tracks are updated.

6. An avian detection system according to claim 5, wherein the predetermined matching conditions to be fulfilled between data of the stored track and the updated plot at least comprise a match between position data of the track and the plot and a match between size data, type of collision object data or ICAO data of the track and the plot.

7. An avian detection system according to claim 1, wherein the one or more processors are configured to determine speed and direction of movement of an object detected by the avian radar system(s) based on a plurality of radar plots holding position and size data obtained from successively received first type of information relating to said detected object.

8. An avian detection system according to claim 1, wherein a transponder plot holds at least part of the transponder data of a corresponding collision object, said transponder data representing all or part of the following: position or location, altitude, direction of movement, speed, type or ICAO code, and status of the collision object.

9. An avian detection system according to claim 1 wherein the one or more processors are configured to classify a determined bird track and a determined collision object track as belonging to a certain classification class.

10. A method in an avian detection system for determining risks of collision between a collision object, such as an air plane, and bird objects that may pose a collision risk with the collision object, the method comprising:
obtaining first type of information data corresponding to one or more objects being detected by the avian detection system, said first type of information data comprising data representing position and size of detected objects: and
providing radar plots based on the first type of information data, wherein a radar plot holds position and size data obtained from the received first type of information relating to the corresponding detected object;
wherein the method further comprises:
obtaining ADS-B transponder data by an ADS-B transponder receiver, said ADS-B transponder data corresponding to one or more collision objects;
providing ADS-B transponder plots based on the transponder data; comparing data of obtained plots;
creating and storing a number of object tracks based on the provided radar plots and transponder plots, each track holding object data corresponding to or determined from data of matching plots; with at least part of the object tracks holding a combination of data obtained from both the radar plots and the transponder plots;
classifying the obtained object tracks as being either a bird track or a collision object track, where a track classified as a collision object track represents a corresponding collision object, and where the classification of an object track as a bird track is based at least partly on stored data representing size of the object, and the classification of an object track as a collision object track is based at least partly on stored data representing size of the object and/or type of collision object or International Civil Aviation Organization ICAO code of collision object; and
determining one or more risks of collision or collision risk levels for at least one collision object based on object data of one or more bird tracks and the corresponding collision object track(s).

11. A method according to claim 10, further comprising:
generating an alarm or alert when a determined collision risk level exceeds a predetermined risk level.

12. A method according to claim 11, wherein the method further comprises classifying a determined bird track and a determined collision object track as belonging to a certain classification class.

13. A method according to claim 10, further comprising:
storing a number of radar plots and transponder plots based on successively received first type of information and successively received transponder data;
comparing data of a number of the stored plots; and
creating one more object tracks based on data of a plurality of the stored plots when predetermined matching conditions are fulfilled for corresponding data of said plurality of stored plots.

14. A method according to claim 10, further comprising:
providing updated radar plots and transponder plots based on received updated first type of information and received updated transponder data;
comparing data of an updated plot with data of stored tracks;
updating data of a stored track when predetermined matching conditions are fulfilled for corresponding data of the stored track and the updated plot, and
determining one or more updated risks of collision or collision risk levels for the at least one collision object when one or more tracks are updated.

15. A method according to claim 14, wherein the predetermined matching conditions to be fulfilled between data of the stored track and the updated plot at least comprise a match between position data of the track and the plot and a match between size data, type of collision object data or ICAO data of the track and the plot.

16. A method according to claim 10, wherein the method further comprises determining speed and direction of movement of an object detected by the avian radar system(s) based on a plurality of radar plots holding position and size data obtained from successively received first type of information relating to said detected object.

17. A method according to claim 10, wherein a transponder plot holds at least part of the transponder data of a corresponding collision object, said transponder data representing all or part of the following: position or location, altitude, direction of movement, speed, type or ICAO code, and status of the collision object.

18. A method according to claim 13, wherein the predetermined matching conditions to be fulfilled between data of the stored plots at least comprise a match between position data of the plots and a match between size data, type of collision object data or ICAO data of the plots.

* * * * *